(12) United States Patent
Meier et al.

(10) Patent No.: US 10,259,432 B1
(45) Date of Patent: Apr. 16, 2019

(54) VEHICLE LIFTER SYSTEM

(71) Applicant: RES-Q-JACK, INC., Elmira, NY (US)

(72) Inventors: John H. Meier, Elmira, NY (US); Nathaniel J. Watts, Elmira, NY (US)

(73) Assignee: RES-Q-JACK, INC., Elmira, NY (US)

( * ) Notice: Subject to any disclaimer, the term of this patent is extended or adjusted under 35 U.S.C. 154(b) by 0 days.

(21) Appl. No.: 16/199,646

(22) Filed: Nov. 26, 2018

Related U.S. Application Data (60) Provisional application No. 62/729,141, filed on Sep. 10, 2018.

(51) Int. Cl.
| | | |
|---|---|---|
| *B66F 3/00* | (2006.01) | |
| *B60S 9/04* | (2006.01) | |
| *B66F 3/02* | (2006.01) | |
| *B60S 9/22* | (2006.01) | |

(52) U.S. Cl.
CPC .................. *B60S 9/04* (2013.01); *B66F 3/02* (2013.01); *B60S 9/22* (2013.01)

(58) Field of Classification Search
CPC ...... B66F 3/00; B66F 3/14; B66F 3/28; B66F 7/00
See application file for complete search history.

(56) References Cited

U.S. PATENT DOCUMENTS

| | | | | |
|---|---|---|---|---|
| 4,783,053 A | * | 11/1988 | Yirmiyahu | A62B 3/005 254/104 |
| 5,673,898 A | * | 10/1997 | Michalo | A62B 3/005 254/93 H |
| 5,810,333 A | * | 9/1998 | Hickerson | A62B 3/005 254/133 R |
| 7,296,776 B2 | | 11/2007 | Pasto | |
| 7,338,025 B2 | | 3/2008 | Pasto | |
| 7,490,813 B1 | * | 2/2009 | Weddle | A62B 3/005 248/354.1 |
| 7,600,731 B2 | | 10/2009 | Pasto | |
| 8,033,527 B2 | | 10/2011 | Pasto | |
| 8,490,939 B2 | | 7/2013 | Pasto | |
| 8,814,142 B2 | * | 8/2014 | Pasto | B66F 3/08 248/499 |
| 2008/0191183 A1 | * | 8/2008 | Rucks | B60S 9/22 254/424 |
| 2013/0087750 A1 | * | 4/2013 | Pasto | B66F 3/00 254/134 |
| 2017/0275994 A1 | * | 9/2017 | Moye | E04G 25/04 |

* cited by examiner

*Primary Examiner* — Lee D Wilson
(74) *Attorney, Agent, or Firm* — Barnes & Thornburg LLP (57) ABSTRACT

A lifter system in accordance with the present disclosure includes a vehicle lifter that can be changed in the field by a user between a collapsed-storage mode and an expanded-use mode to lift or stabilize a portion of an object such as an overturned or inoperable vehicle.

20 Claims, 10 Drawing Sheets

VEHICLE LIFTER SYSTEM

PRIORITY CLAIM

This application claims priority under 35 U.S.C. § 119(e) to U.S. Provisional Application No. 62/729,141, filed Sep. 10, 2018, which is expressly incorporated by reference herein.

BACKGROUND

The present disclosure relates to a mechanical device such as a jack that is used as a lifting device to lift heavy loads, and particularly to vehicle jacks. More particularly, the present disclosure relates to devices for lifting or stabilizing inoperable vehicles.

SUMMARY

A lifter system in accordance with the present disclosure includes a vehicle lifter that can be changed in the field by a user between a COLLAPSED-STORAGE mode and an EXPANDED-USE mode to lift or stabilize a portion of an object such as an overturned or inoperable vehicle. In illustrative embodiments, the vehicle lifter includes a stationary base that is adapted to rest on ground adjacent to the inoperable vehicle and a movable vehicle grip that includes a claw configured to engage a portion of the inoperable vehicle and that is mounted for up-and-down motion relative to the stationary base during a mode change of the vehicle lifter.

In illustrative embodiments, the lifter system further comprises a motion converter and a separate lifter drive unit that (when mated) cooperate to cause the movable vehicle grip to move up and down relative to the stationary base along a grip-motion axis between a retracted position associated with the COLLAPSED-STORAGE mode of the vehicle lifter and an extended position associated with the EXPANDED-USE mode of the vehicle lifter. The motion converter includes a rotatable torque-receiver pin and a vehicle-grip mover that is mounted on the vehicle lifter and operable to move the movable vehicle grip up and down on the stationary base in response to rotation of the rotatable torque-receiver pin about an axis of pin rotation.

In illustrative embodiments, the lifter drive unit includes a torque generator that includes a pin-rotator socket that mates with the rotatable torque-receiver pin of the motion converter when the lifter drive unit is mounted on the movable vehicle grip of the motion converter. The torque generator also includes an electrified socket-spinner system for spinning the pin-rotator socket to rotate the torque-receiver pin about the axis of pin rotation. When the torque-receiver pin is rotated in a first direction, the vehicle-grip mover that is coupled to the torque-receiver pin causes the movable vehicle grip to move relative to the stationary base to the extended position to establish the EXPANDED-USE mode of the vehicle lifter. In contrast, when the torque-receiver pin is rotated in an opposite second direction, the vehicle-grip mover functions to cause the movable vehicle grip to move to the retracted position to establish the COLLAPSED-STORAGE mode of the vehicle lifter.

In illustrative embodiments, the lifter drive unit also includes a generator housing and a generator mount. The generator housing contains the pin-rotator socket and the socket-spinning system. The generator mount is coupled to the generator housing in a stationary position on the vehicle-grip mover of the motion converter at the option of a user to mate the pin-rotator socket of the torque generator with the torque-receiver pin of the motion converter.

In illustrative embodiments, the generator mount includes a socket-alignment guide and a grip-mover clamp. The socket-alignment guide is coupled to a lower portion of the generator housing, used to align the pin-rotator socket with the torque-receiver pin during installation of the lifter drive unit on the motion converter, and used to prevent rotation of generator housing in relation to vehicle-grip mover when pin-rotator socket is transferring torque to torque-receiver pin. The grip-mover clamp is coupled to an upper portion of the generator housing and used to retain the generator housing on the vehicle grip mover of the motion converter.

Additional features of the present disclosure will become apparent to those skilled in the art upon consideration of the following detailed description of illustrative embodiments exemplifying the best mode of carrying out the disclosure as presenting perceived.

BRIEF DESCRIPTION OF THE DRAWINGS

The detailed description particularly refers to the accompanying figures in which:

FIG. 2 is a partial diagrammatic perspective view of the lifter system shown in FIG. 1 showing that the vehicle lifter includes a stationary base adapted to rest on the ground and a movable vehicle grip that is configured to move up and down relative to the base as the vehicle lifter is changed from the COLLAPSED-STORAGE mode to the EXPANDED-USE mode, and showing that the lifter system also includes a motion converter for moving the vehicle grip relative to the base, and further showing that the lifter drive unit includes a generator mount that will be used to couple the lifter drive unit to a vehicle-grip mover included in the motion converter as suggested in FIGS. 3 and 8-11 and a torque generator having a pin-rotator socket that will mate to a torque-receiver pin included in the motion converter when the lifter drive unit is coupled to the vehicle-grip mover as suggested in FIGS. 10 and 11 to generate the torque needed to rotate the torque-receiver pin about an axis of pin rotation to cause the vehicle-grip mover to move the vehicle grip relative to the base when the mode of the vehicle lifter is changed by the operator;

FIGS. 8-11 show an installation sequence during mounting of the lifter drive unit on the vehicle-grip mover of the motion converter;

DETAILED DESCRIPTION

Figures 2, 3:
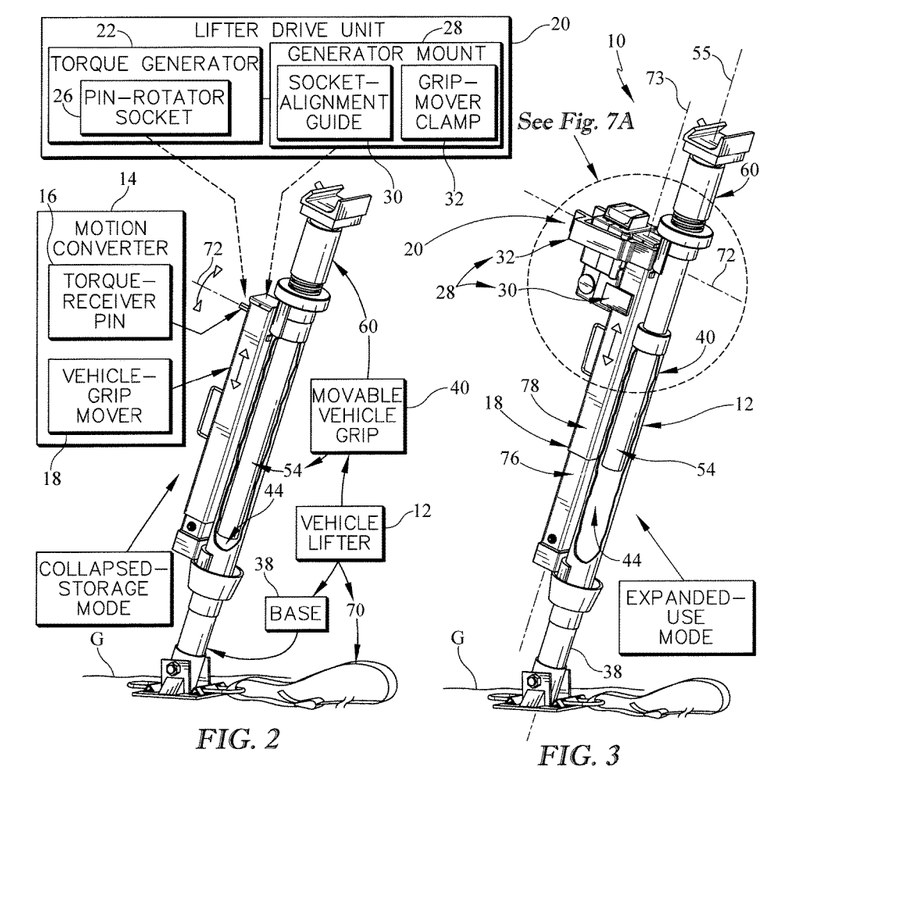
FIG. 3 is a perspective view of the lifter system shown in FIG. 1 showing that an illustrative lifter drive unit shown in more detail in FIGS. 5 and 6 has been coupled to the motion converter so that the pin-rotator socket of the lifter drive unit can engage and rotate the torque-receiver pin of the motion converter to cause the vehicle-grip mover to move the movable vehicle grip upwardly relative to the stationary base to change the vehicle lifter to the EXPANDED-USE mode.
Figure 4:
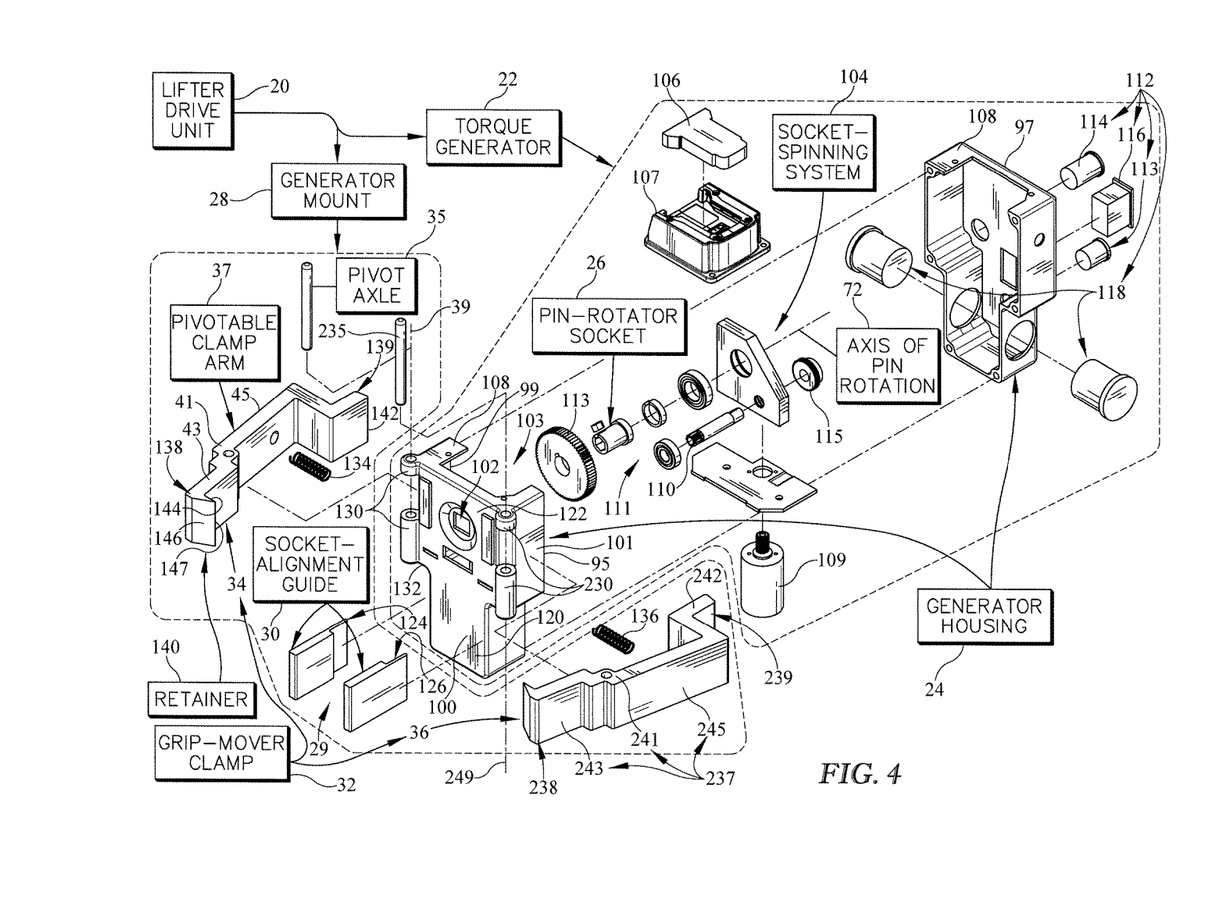
FIG. 4 is an exploded perspective assembly view of the lifter drive unit of FIG. 3 showing that the torque generator includes a generator housing that contains the pin-rotator socket and an electrified socket-spinning system for spinning the pin-rotator socket about the axis of pin rotation and showing that the generator mount includes a socket-alignment guide for aligning the pin-rotator socket with the torque-receiver pin during mounting of the lifter drive unit on the vehicle-grip mover of the motion converter and a grip-mover clamp for retaining the generator housing of the lifter drive unit in a stationary mounted position on the vehicle-grip mover of the motion converter.
Figures 7A, 7B:
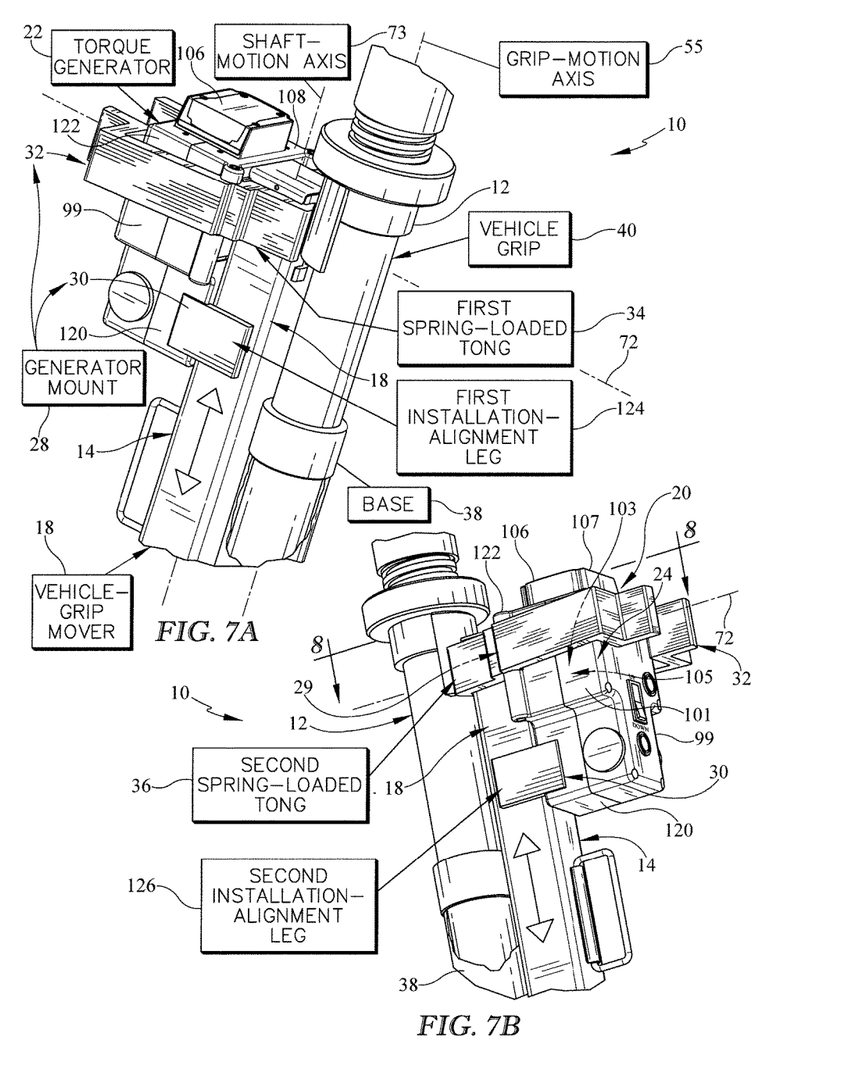
FIG. 7A is an enlarged perspective view of the circled region of the lifter system shown in FIG. 3 showing that a first installation-alignment leg of the socket-alignment guide engages one side of the vehicle-grip mover of the motion converter while a first pivotable spring-loaded tong of the grip-mover clamp engages a first upper portion of the vehicle-grip mover to help retain the torque generator of the lifter drive unit in the mounted position on the vehicle-grip mover of the motion converter.
FIG. 7B is similar to FIG. 7A from a different point of view to show that a second installation-alignment leg of the socket-alignment guide engages an opposite side of the vehicle-grip mover of the motion converter while a second pivotable spring-loaded tong of the grip-mover clamp engages a second upper portion of the vehicle-grip mover to help retain the torque generator of the lifter drive unit in the mounted position on the vehicle-grip mover of the motion converter.

A lifter system 10 includes struts or a vehicle lifter 12 adapted to move between a COLLAPSED-STORAGE mode for storage and transit and an EXPANDED-USE mode for lifting or stabilizing a motor vehicle 13, a jack or motion converter 14 including a torque-receiver pin 16 and a vehicle-grip mover 18 and configured to convert rotational drive of torque-receiver pin 16 into a static extension force for vehicle-grip mover 18 to change the mode of vehicle lifter 12, and a lifter drive unit 20 adapted to couple to and provide rotational energy to motion converter 14, as suggested diagrammatically in FIG. 2. Lifter drive unit 20 includes a torque generator 22 having a generator housing 24 that contains a pin-rotator socket 26 that provides rotational energy to torque-receiver pin 16 of motion converter 14, as shown in FIG. 4, and lifter drive unit 20 further includes a generator mount 28 separate from torque generator 22 that couples to vehicle-grip mover 18 to secure pin-rotator socket 26 to torque-receiver pin 16, as shown in FIG. 7A. The generator mount 28 includes a socket-alignment guide 30 coupled to generator housing 24 to align pin-rotator socket 26 with torque-receiver pin 16 and a grip-mover clamp 32 having a first and second spring-loaded tongs 34, 36 coupled to generator housing 24 and configured to secure lifter drive unit 20 to vehicle-grip mover 18 of motion converter 14 when torque-receiver pin 16 is inserted in pin-rotator socket 26, as shown in FIGS. 7A and 7B.

Figure 3A:
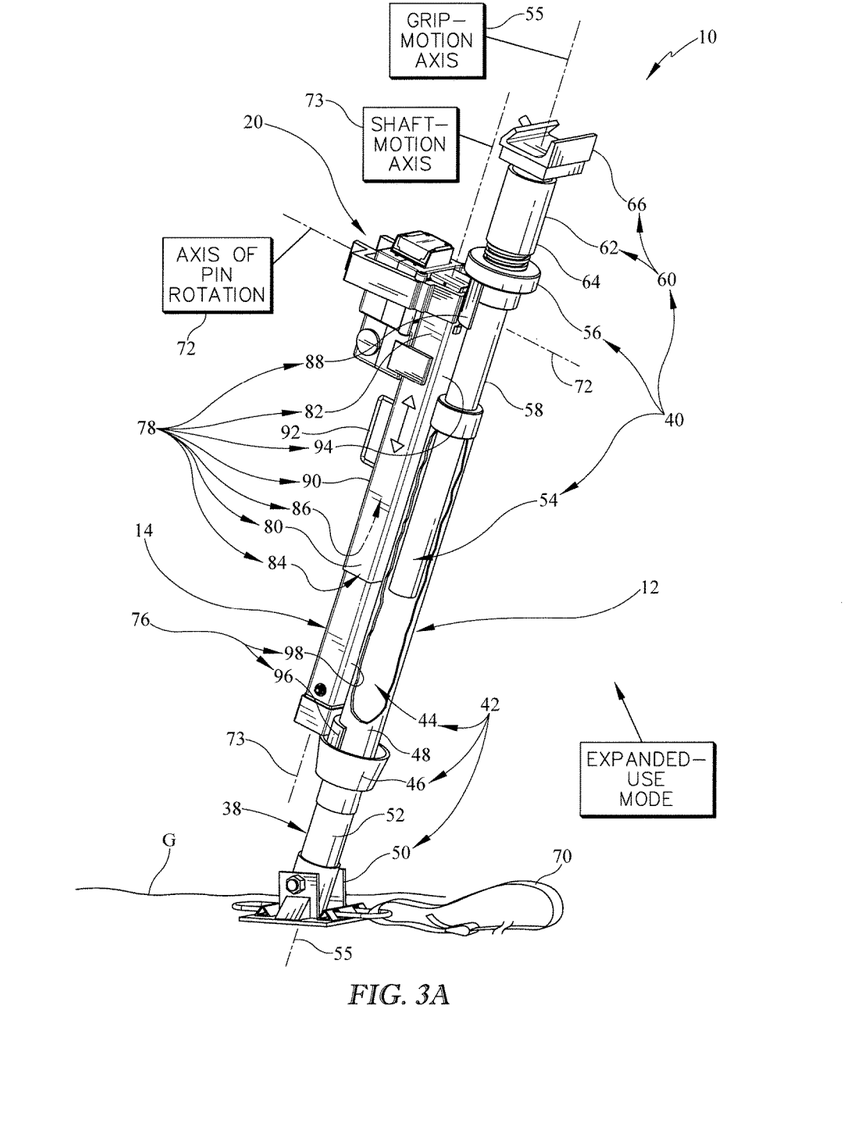
FIG. 3A is a perspective view of the lifter system shown in FIG. 3 showing the vehicle lifter and the motion converter in greater detail.

Vehicle lifter 12 includes a stationary base 38 adapted to rest on the ground and a movable vehicle grip 40 movable by vehicle-grip mover 18 of motion converter 14 relative to stationary base 38, as shown in FIG. 3. Stationary base 38 includes a grip support 42 having a rod-receiving chamber 44 extending therethough, an annular lower stop collar 46 arranged to circumferentially surround an outer surface 48 of grip support 42, and a foundation 50 pivotably coupled to a lower end 52 of grip support 42 to allow grip support 42 to rest on the ground during use of vehicle lifter 12, as shown in FIG. 3A. Movable vehicle grip 40 includes a telescoping inner rod 54 configured and arranged to slide up and down relative to grip support 42 within rod-receiving chamber 44 of grip support 42 along a grip-motion axis 55 and an annular upper stop collar 56 coupled to an upper end 58 of telescoping inner rod 54 and arranged to lie outside of rod-receiving chamber 44 as telescoping inner rod 54 of movable vehicle grip 40 slides along grip-motion axis 55. Movable vehicle grip 40 also includes a vehicle-engaging arm 60 including a connector rod 62 coupled to upper stop collar 56 at a lower end 64 of connector rod 62 and a claw 66 defined at an upper end 68 of connector rod 62 adapted to engaged motor vehicle 13 when vehicle lifter 12 is in use. Vehicle lifter 12 includes a tether 70 coupled to foundation 50 of base 38 and configured to couple to a motor vehicle 13 during use of vehicle lifter 12 to provide a tension force acting on the motor vehicle 13 as the motor vehicle 13 is lifted by vehicle lifter 12.

Torque-receiver pin 16 of motion converter 14 is mounted for rotation about an axis of pin rotation 72, as shown in FIG. 3. Vehicle-grip mover 18 of motion converter 14 includes a telescoping inner shaft 76 and an outer shaft 78 arranged to move up and down relative to one another along a shaft-motion axis 73 that is parallel to grip-motion axis 55 in response to rotation of torque-receiver pin 16 about axis of pin rotation 72. Axis of pin rotation 72 is perpendicular to shaft-motion axis 73 and grip-motion axis 55. In other illustrative embodiments, the axis of pin rotation may be arranged at any angle or orientation relative to shaft-motion axis 73 and grip-motion axis 55 suitable to allow motion converter 14 to convert rotational drive of torque-receiver pin 16 into static extension force for vehicle-grip mover 18.

Outer shaft 78 of vehicle-grip mover 18 includes a first end 80, a second end 82 opposite first end 80, an opening 84 formed in first end 80, and an inner-shaft-receiving chamber 86 extending through outer shaft 78 from opening 84 toward second end 82, as shown in FIG. 3A. Outer shaft 78 further includes an attachment plate 88 coupled to a front exterior wall 94 of outer shaft 78 at second end 82, and a carrying handle 92 coupled to a rear exterior wall 90 of outer shaft 78. Telescoping inner shaft 76 of vehicle-grip mover 18 includes an inner-shaft attachment plate 96 coupled to a front exterior surface 98 of telescoping inner shaft 76 and arranged to lie outside inner-shaft-receiving chamber 86 as telescoping inner shaft 76 and outer shaft 78 slide relative to one another along shaft-motion axis 73.

Vehicle-grip mover 18 of motion converter 14 is mounted on movable vehicle grip 40 of vehicle lifter 12 and vehicle-grip mover 18 arranged to lie between annular lower stop collar 46 of stationary base 38 and annular upper stop collar 56 of movable vehicle grip 40, as shown in FIG. 3A. Inner-shaft attachment plate 96 is coupled to annular lower stop collar 46 of stationary base 38 and outer-shaft attachment plate 88 is coupled to annular upper stop collar 56 of movable vehicle grip 40 such that inner shaft 76 remains stationary and outer shaft 78 moves along shaft-motion axis 73 relative to inner shaft 76 to move movable vehicle grip 40 along grip-motion axis 55 to an extended position associated with the EXPANDED-USE mode of vehicle lifter 12, as shown in FIG. 3A.

Figure 16:
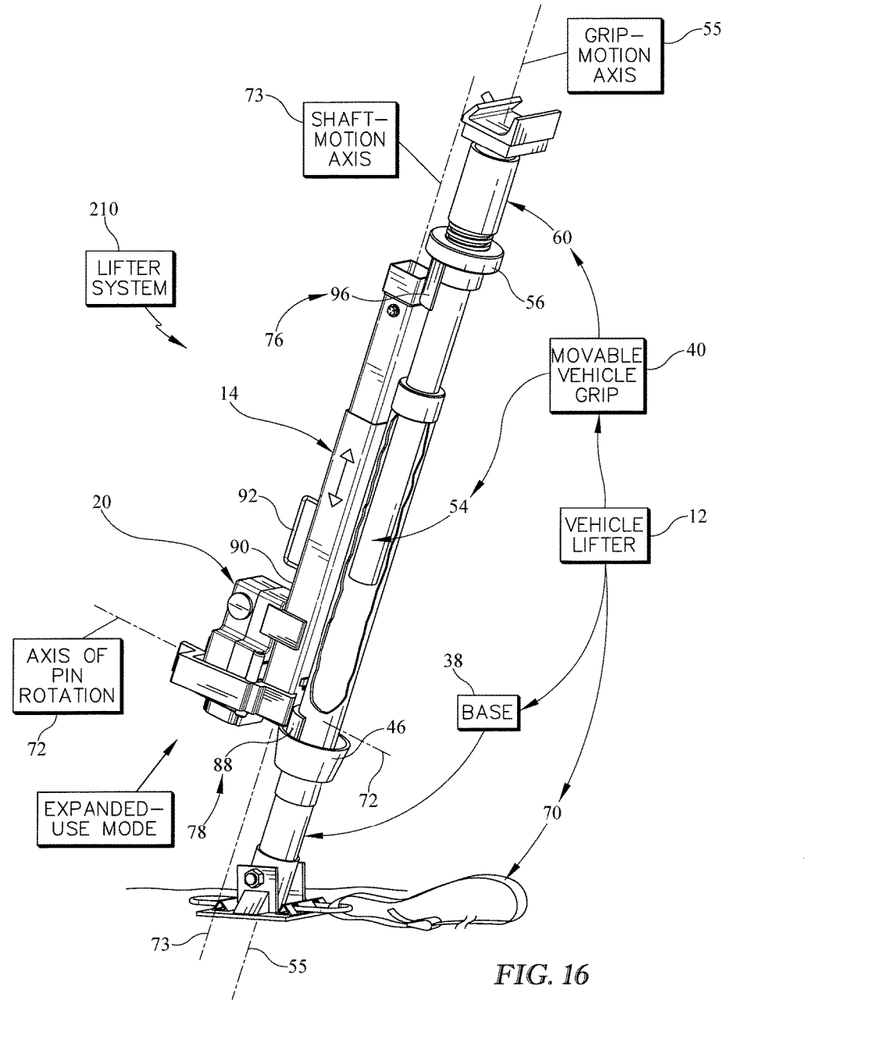
FIG. 16 is a perspective view of an alternative embodiment of the present disclosure showing a lifter system that is similar to the lifter system shown in FIG. 1 but showing that the motion converter may be coupled to the vehicle lifter in the inverse position to allow an operator to choose whether the torque-receiver pin of the motion converter and therefore the pin-rotator socket of lifter drive unit coupled thereto will remain stationary or slide up and down when the vehicle lifter is changed between the COLLAPSED-STORAGE mode and the EXPANDED-USE mode.

In another illustrative embodiment shown in FIG. 16, vehicle-grip mover 18 of motion converter 14 is mounted on movable vehicle grip 40 in an inverse position relative to the mounting position shown in FIG. 3 such that outer-shaft attachment plate 88 is coupled to annular lower stop collar 46 of the stationary base 38 and the inner-shaft attachment plate 96 is coupled to annular upper stop collar 56 of movable vehicle grip 40 such that outer shaft 78 remains stationary and inner shaft 76 moves along shaft-motion axis 73 relative to outer shaft 78 to move movable vehicle grip 40 along grip-motion axis 55 to the extended position associated with the EXPANDED-USE mode of vehicle lifter 12. The variable mounting feature of motion converter 14 onto vehicle lifter 12 allows a user to choose whether torque-receiver pin 16 of motion converter 14 and pin-rotator socket 26 of lifter drive unit 20 coupled thereto will remain stationary or slide along shaft-motion axis 73 when vehicle lifter 12 is changed between the COLLAPSED-STORAGE mode and the EXPANDED-USE mode.

Generator housing 24 includes a front exterior surface 100 having an exterior aperture 102 formed therein that exposes pin-rotator socket 26 to the outside surroundings, as shown in FIG. 4. Generator housing 24 encloses a socket-spinning system 104 that is energized by a detachable battery 106 positioned in a battery holder 107 mounted on an upwardly facing top surface 108 of generator housing 24 and includes a spur gear 110 configured to apply a torque to pin-rotator socket 26. In other illustrative embodiments, socket-spinning system 104 may include different gears and other drive components capable of providing sufficient torque to pin-rotator socket 26 to change vehicle lifter 12 from the COLLAPSED-STORAGE mode to the EXPANDED-USE mode such as, for example, a planetary gearbox.

Figure 6:
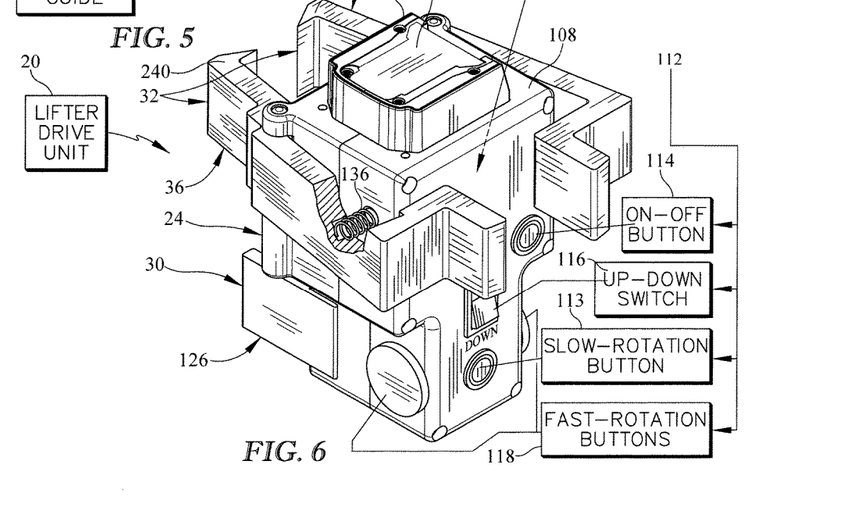
FIG. 6 is a rear perspective view of the lifter drive unit of FIG. 4 showing that a battery has been inserted into a battery receiver formed in the battery holder that is mounted on the top wall of the generator housing.

Generator housing 24 further includes a drive control 112 configured to actuate and adjust socket-spinning system 104, as shown in FIG. 6. Drive control 112 includes an ON-OFF button 114, an UP-DOWN switch 116 that sets the direction of rotation of socket-spinning system 104 and thereby the direction of movement of vehicle-grip mover 18. Drive control 112 further includes a pair of fast-rotation buttons 118 configured to cause the socket-spinning system 104 to cause pin-rotator socket 26 to spin at a first speed with a first torque when each of the pair of fast-rotation buttons 118 is compressed and configured to prevent pin-rotator socket 26 from spinning when at least one of the pair of fast-rotation buttons 118 is not compressed.

Figure 5:
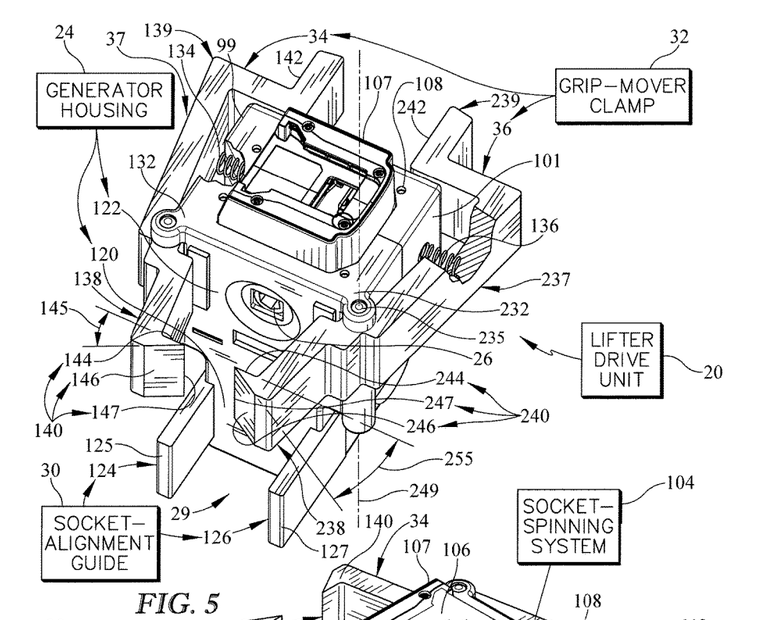
FIG. 5 is a front perspective view of the lifter drive unit before it is mounted on the motion converter as suggested in FIGS. 2 and 3 and showing that the socket-alignment guide includes a pair of laterally spaced-apart installation-alignment legs coupled to a lower part of the generator housing and the grip-mover clamp includes an opposing pair of laterally spaced-apart pivotable spring-loaded tongs coupled to an upper part of the generator housing and showing that an empty battery holder is mounted on a top wall of the generator housing.

Drive control 112 further includes a slow-rotation button 113 that, in response to being compressed, is configured to cause socket spinning system 104 to cause pin-rotator socket 26 to spin at a second speed that is relatively lower than the first speed associated with fast-rotation buttons 118, as shown in FIG. 5. The slower rotation of pin-rotator socket 26 facilitates mating engagement of pin-rotator socket 26 and torque-receiver pin 16 as lifter drive unit 20 is advanced toward motion converter 14 with pin-rotator socket 26 and torque-receiver pin 16 aligned on axis of pin rotation 72. In other illustrative embodiments, socket-spinning system further includes a controller configured to detect a load on the motor 109 that is indicative of the weight being lifted, and if the weight is below a predetermined threshold then the controller will drive motor 109 at the first speed and first torque, and if the weight is above a predetermined threshold then the controller will drive motor 109 at a lesser speed and greater torque relative to the first speed and first toque. In other illustrative embodiments, the drive control further includes an output screen that is configured to display at least one of the speed of rotation of a spinning component, the torque output by a component of the lifter system, or the load or weight on vehicle lifter 12.

Socket-alignment guide 30 of generator mount 28 is coupled to a lower portion 120 of generator housing 24 to align pin-rotator socket 26 with torque-receiver pin 16, as suggested by FIG. 5. Grip-mover clamp 32 is coupled to an upper portion 122 of generator housing 24 to allow lifter drive unit 20 to clamp onto and unclamp from vehicle-grip mover 18, as suggested by FIG. 5. Socket-alignment guide 30 includes a pair of laterally spaced-apart installation-alignment legs 124, 126 coupled to first and second oppositely-facing exterior side surfaces 99, 101 of generator housing 24.

First spring-loaded tong 34 of grip-mover clamp 32 includes a pivot axle 35 positioned in an annular receptacle 130 positioned on a forward-side corner 132 of generator housing 24 and a pivotable clamp arm 37 mounted on pivot axle 35 for pivotable movement about an arm-pivot axis 39 aligned with pivot axle 35, as shown in FIG. 4. Pivotable clamp arm 37 is formed to include a pivot-chamber 41 configured to receive the pivot axle 35 that is positioned in annular receptacle of 130 of generator housing 24 to couple pivotable clamp arm 37 to generator housing 24. Pivotable clamp arm 37 further includes a first connector section 43 coupled to and extending forwardly from the pivot-chamber 41 to a first end 138 of the pivotable clamp arm 37 and a second connector section 45 coupled to and extending rearwardly from pivot-chamber 41 to a second end 139 of pivotable clamp arm 37, as shown in FIG. 4.

First spring loaded tong 34 of grip-mover clamp 32 further includes a first spring 134 positioned laterally between first spring-loaded tong 34 and the first exterior side surface 99 of generator housing 24, as shown in FIG. 5. First spring 134 is positioned rearwardly of annular receptacle 130 such that spring 134 biases spring-loaded tong 34 toward spring-loaded tong 36 at first end 138 of pivotable clamp arm 37 and away from spring-loaded tong 36 at the second end 139 of pivotable clamp arm 37. It is within the scope of the present disclosure to replace the compression-type spring 134 with a torsion spring wound around pivot axle 35 or any other biasing mechanism suitable to bias spring-loaded tong 34 toward spring-loaded tong 36 at first end 138 of pivotable clamp arm 37 and away from spring-loaded tong 36 at second end 139 of pivotable clamp arm 37. Spring-loaded tong 34 further includes a retainer 140 defined at first end 138 of pivotable clamp arm 37 and coupled to first connector section 43 of pivotable clamp arm 37 and a retainer-release fingergrip tab 142 defined at second end 139 of pivotable clamp arm 37 and coupled to second connector section 45, as shown in FIGS. 4 and 5. Retainer 140 extends laterally toward the spring-loaded tong 36 and includes a removal blocking surface 144 facing toward generator housing 24 and a cam-ramp surface 146 facing away from generator housing 24 and sloping downwardly toward removal block surface 144 to a tip 147 defined at the intersection of removal blocking surface 144 and cam-ramp surface 146, as shown in FIG. 5.

Second spring-loaded tong 36 of grip-mover clamp 32 includes a pivot axle 235 positioned in an annular receptacle 230 positioned on a forward-side corner 232 of generator housing 24 and a pivotable clamp arm 237 mounted on a pivot axle 235 for pivotable movement about an arm-pivot axis 249 aligned with pivot axle 235. Pivotable clamp arm 237 is formed to include a pivot-chamber 241 configured to receive the pivot axle 235 that is positioned in annular receptacle of 230 of generator housing 24 to couple pivotable clamp arm 237 to generator housing 24. Pivotable clamp arm 237 further includes a first connector section 243 coupled to and extending forwardly from the pivot-chamber 241 to a first end 238 of the pivotable clamp arm 237 and a second connector section 245 coupled to and extending rearwardly from pivot-chamber 241 to a second end 239 of pivotable clamp arm 237, as shown in FIG. 4.

Second spring loaded tong 36 of grip-mover clamp 32 further includes a second spring 136 positioned laterally between second spring-loaded tong 36 and the second exterior side surface 101 of generator housing 24, as shown in FIG. 5. Second spring 136 is positioned rearwardly of annular receptacle 230 such that spring 136 biases spring-loaded tong 36 toward spring-loaded tong 34 at first end 238 of pivotable clamp arm 237 and away from spring-loaded tong 34 at second end 239 of pivotable clamp arm 237. It is within the scope of the present disclosure to replace the compression-type spring 136 with a torsion spring wound around pivot axle 235 or any other biasing mechanism suitable to bias spring-loaded tong 36 toward spring-loaded tong 34 at first end 238 of pivotable clamp arm 237 and away from spring-loaded tong 34 at second end 239 of pivotable clamp arm 237. Spring-loaded tong 36 further includes a retainer 240 defined at first end 238 of pivotable clamp arm 237 and coupled to first connector section 243 of pivotable clamp arm 237 and a retainer-release fingergrip tab 242 defined at second end 239 of pivotable clamp arm 237 and coupled to second connector section 245, as show in FIGS. 4 and 5. Retainer 240 extends laterally toward the spring-loaded tong 34 and includes a removal blocking surface 244 facing toward generator housing 24 and a cam-ramp surface 246 facing away from generator housing 24 and sloping downwardly toward removal block surface 244 to a tip 247 defined at the intersection of removal blocking surface 244 and cam-ramp surface 246, as shown in FIG. 5.

Figure 8:
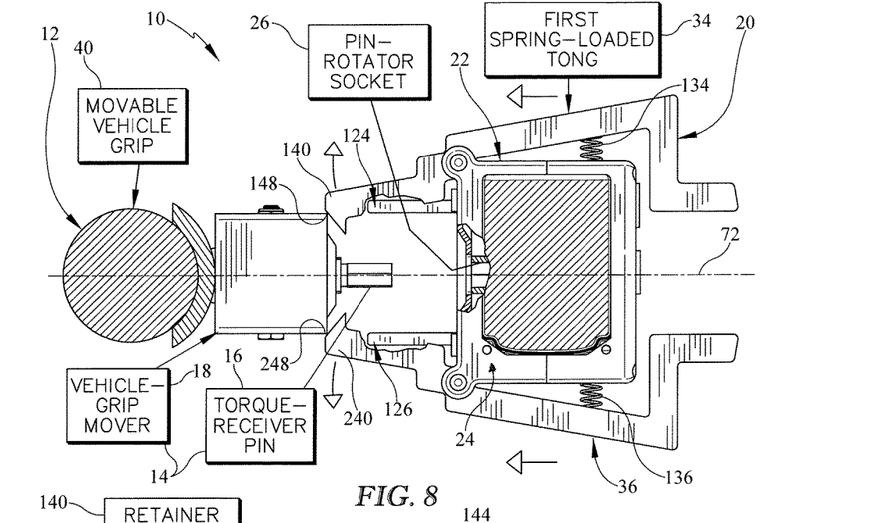
FIG. 8 is a sectional view taken along line 8-8 of FIG. 7B showing a separation between the torque-receiver pin of the motion converter and the pin-rotator socket of the torque generator before the torque generator is mounted on the vehicle-grip mover of the motion converter and suggesting that the first and second pivotable spring-loaded tongs will be cammed in opposite outward directions once they first contact the vehicle-grip mover.
Figure 9:
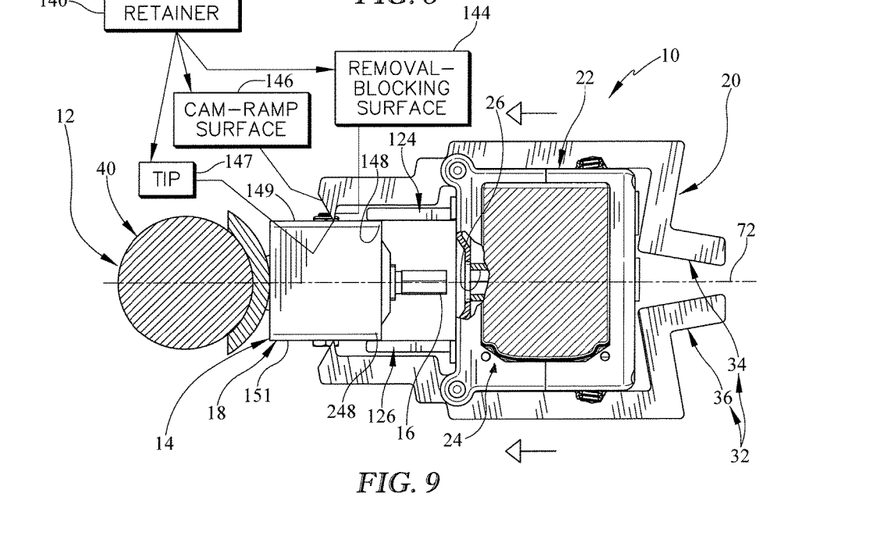
FIG. 9 is a view similar to FIG. 8 showing sliding engagement of the first and second installation-alignment legs of the socket-alignment guide during sliding movement of the lifter drive unit toward the vehicle-grip mover of the motion converter and showing that the first and second pivotable spring-loaded tongs of the grip-mover clamp have been moved apart to compress the springs associated with the tongs and showing that the pin-rotator socket of the torque generator has been moved closer to the torque-rotator pin of the motion converter.

As lifter drive unit 20 moves into engagement with vehicle-grip mover 18, cam-ramp surfaces 146, 246 of retainers 140, 240 contact and slide along rearward-side corners 148, 248 of vehicle-grip mover 18 causing retainers 140, 240 of spring-loaded tongs 34, 36 to move apart from one another against the bias of springs 134, 136, as shown in FIG. 8 of the sequence shown in FIGS. 8-11. As lifter drive unit 20 moves into further engagement with vehicle-grip mover 18, cam-ramp surfaces 146, 246 slide off and forward of rearward-side corners 148, 248 of vehicle-grip mover 18 and retainers 140, 240 slide onto and forwardly along a pair of oppositely-facing exterior side walls 149, 151 of vehicle-grip mover 18, as shown in FIG. 9.

Figure 10:
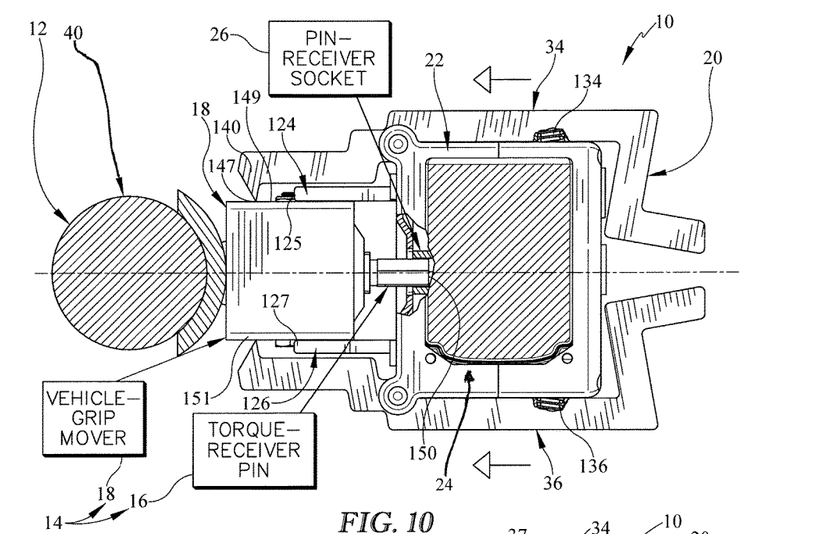
FIG. 10 is a view similar to FIGS. 8 and 9 showing that a free end of the torque-receiver pin has been inserted partly into the pin-rotator socket.
Figure 11:
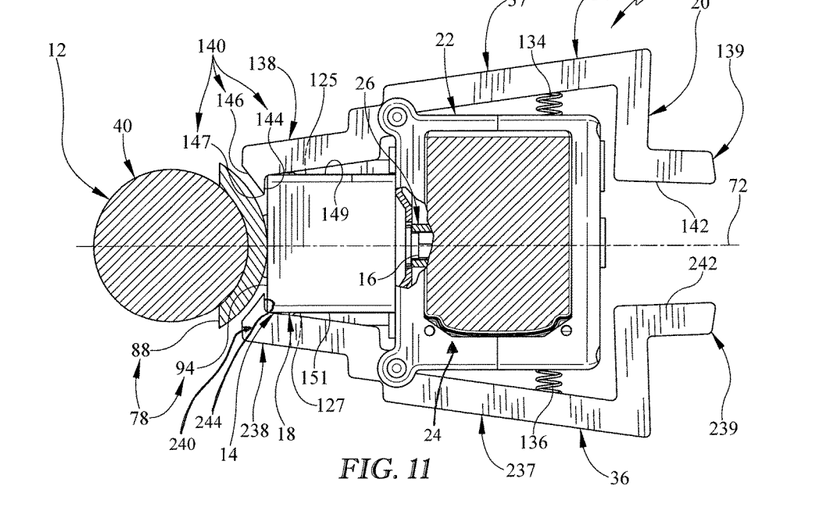
FIG. 11 is a view similar to FIGS. 8-10 showing that the free end of the torque-receiver pin has been inserted fully into the pin-rotator socket and showing that a retainer coupled to a forward end of each of the pivotable spring-loaded tongs has engaged a far end of the vehicle-grip mover to retain the lifter drive unit in a mounted position on the vehicle-grip mover.

As generator housing 24 of lifter drive unit 20 advances nearer to vehicle-grip mover 18, first and second installation-alignment legs 124, 126 of socket alignment guide 30 slide forwardly along oppositely-facing exterior side walls 149, 151 of vehicle-grip mover 18 to align pin-rotator socket 26 with torque-receiver pin 16 so that a free end 150 of torque-receiver pin 16 inserts partly into pin-rotator socket 26, as shown in FIG. 10. When torque-receiver pin 16 is inserted fully into pin-rotator socket 26, retainers 140, 240 of spring-biased tongs 34, 36 are positioned forwardly of oppositely-facing exterior side walls 149, 151 of vehicle-grip mover 18 between front exterior wall 94 of outer shaft 78 of vehicle-grip mover 18 and outer-shaft attachment plate 88 of outer shaft 78 of vehicle-grip mover 18, as shown in FIG. 11. In this position, removal blocking surfaces 144, 244 of retainers 140, 240 are positioned forwardly of and in the profile of front exterior wall 94 of outer shaft 78 of vehicle-grip mover 18 to prevent rearward movement of lifter drive unit 20 in relation to vehicle-grip mover 18. Opposing retainer-release fingergrip tabs 142, 242 may be pressed inwardly toward one another against the bias of springs 134, 136 by a user to move removal blocking surfaces 144, 244 outwardly away from another and out of the profile of front exterior wall 94 of outer shaft 78 of vehicle-grip mover 18 so that lifter drive unit 20 may be disengaged from vehicle-grip mover 18.

Figure 12:
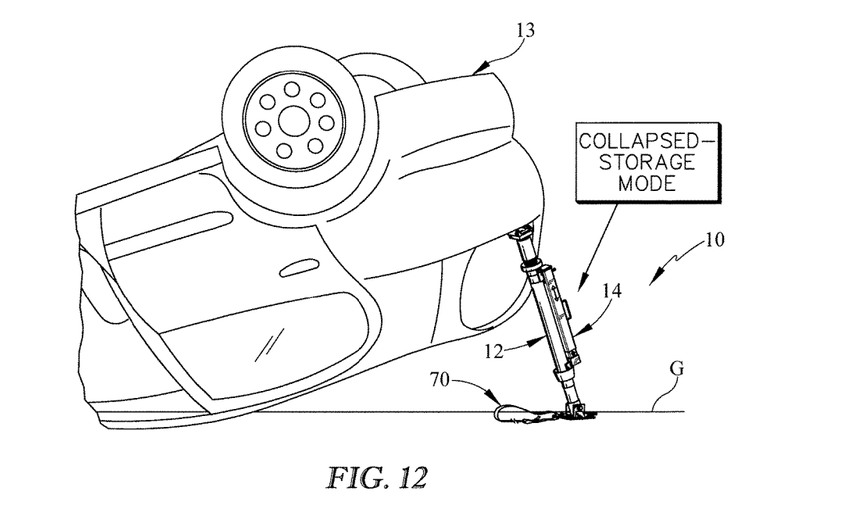
FIG. 12 is a perspective view of the overturned vehicle and the vehicle lifter of FIG. 1 showing that the vehicle lifter is positioned under the overturned vehicle while the vehicle lifter is in the COLLAPSED-STORAGE mode.
Figure 13:
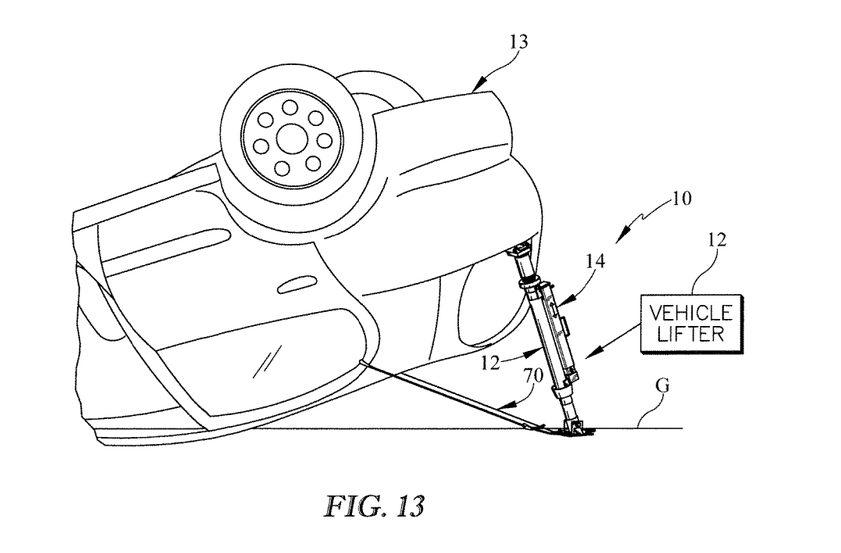
FIG. 13 is a perspective view of the overturned vehicle and the vehicle lifter of FIG. 12 showing a tether also included the vehicle lifter is coupled to the overturned vehicle to apply a tension force to the overturned vehicle.
Figure 14:
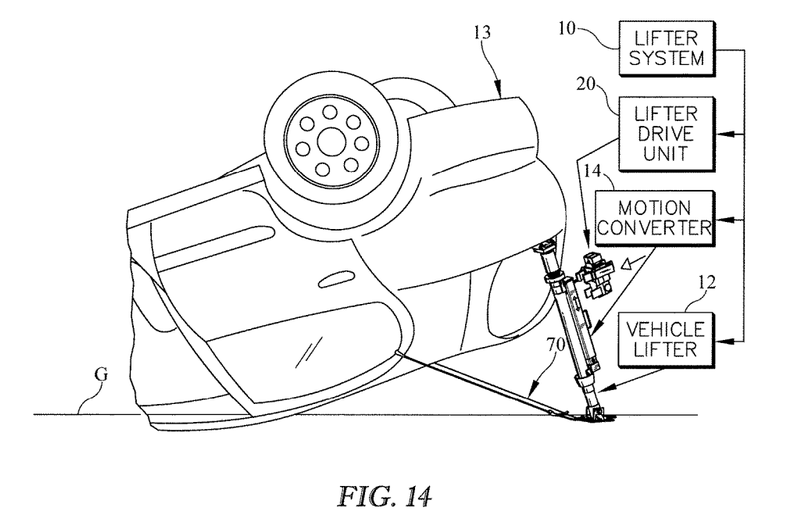
FIG. 14 is a perspective view of the lifter system showing that the lifter drive unit is being advanced toward the motion converter of the lifter system, but not yet coupled to the vehicle-grip mover such that the vehicle lifter is still in the COLLAPSED-STORAGE mode.
Figure 15:
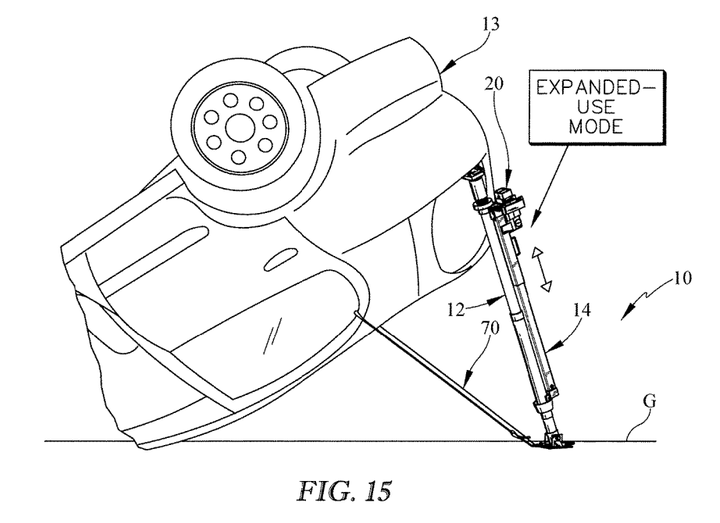
FIG. 15 is a perspective view of the lifter system of FIG. 14 showing that the lifter drive unit is now coupled to the motion converter and showing that the lifter drive unit has provided power to the motion converter to convert a rotational drive provided by the lifter drive unit into a static extension force to move vehicle lifter into the EXPANDED-USE mode so that a right side of the overturned vehicle is lifted from the ground while a left side of the vehicle is maintained in place by the tension force of the tether.

In use, vehicle lifter 12 is positioned under a first portion of a motor vehicle 13 while vehicle lifter 12 is in the COLLAPSED-STORAGE mode, as shown in FIG. 12 of the sequence shown in FIGS. 12-15. Tether 70 of vehicle lifter 12 is coupled to a second portion of the motor vehicle 13, as shown in FIG. 13. Lifter drive unit 20 is advanced toward vehicle-grip mover 18 of motion converter 14 (as described above in the sequence associated with FIGS. 8-11), as shown in FIG. 14. Lifter drive unit 20 is actuated so that lifter drive unit 20 provides power to motion converter 14 to convert rotational drive provided by pin-rotator socket 26 into static extension force for vehicle-grip mover 18 to move vehicle lifter 12 into the EXPANDED-USE mode so that the first portion of motor vehicle 13 is lifted from the ground while the second portion of motor vehicle 13 is maintained in place by a tension force applied by tether 70, as shown in FIG. 15.

Figure 1:
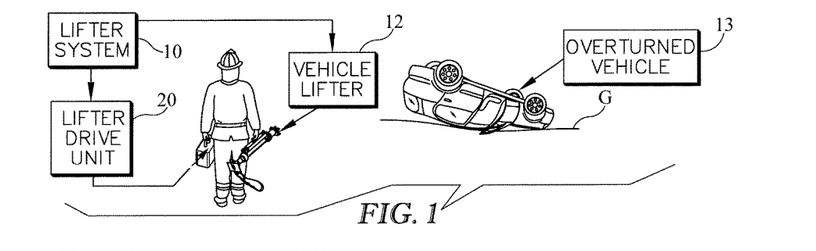
FIG. 1 is a perspective view of an overturned vehicle shown in the background and a lifter system being carried by a user shown in the foreground, the lifter system including a vehicle lifter shown in a COLLAPSED-STORAGE mode and carried in a right hand of a user approaching the overturned vehicle and a lifter drive unit contained inside an optional illustrative case carried in a left hand of the user and configured to be removed from the case and mounted on the vehicle lifter as suggested in FIGS. 2 and 3 so that the lifter drive unit can be operated later by the user to lift a portion of the overturned vehicle upwardly by changing the vehicle lifter from the COLLAPSED-STORAGE mode shown in FIGS. 1 and 14 to an EXPANDED-USE mode shown in FIGS. 3 and 15.

Lifter system 10 includes vehicle lifter 12, motion converter 14, and lifter drive unit 20, as shown in FIGS. 1-3. Vehicle lifter 12 includes stationary base 38 adapted to rest on the ground and movable vehicle grip 40 movable relative to stationary base 38 between extended position associated with the EXPANDED-USE mode of vehicle lifter 12 to raise a vehicle relative to the ground and a contracted position associated with the COLLAPSED-STORAGE mode of vehicle lifter 12 to make vehicle lifter 12 more compact for storage and transit. Motion converter 14 includes torque-receiver pin 16 that is mounted for rotation about axis of pin rotation 72 and vehicle-grip mover 18 configured to move movable vehicle grip 40 up and down along grip-motion axis 55 in response to rotation of torque-receiver pin 16 about axis of pin rotation 72.

Lifter drive unit 20 includes torque generator 22 and separate generator mount 28, as shown in FIGS. 2 and 4. Torque generator 22 includes pin-rotator socket 26 that is coupled to torque-receiver pin 16 and configured to rotate torque-receiver pin 16 about axis of pin rotation 72 to cause vehicle-grip mover 18 to move movable vehicle grip 40 along grip-motion axis 55 relative to stationary base 38 during a mode change of vehicle lifter 12 between the COLLAPSED-STORAGE mode and the EXPANDED-USE mode. Generator mount 28 is arranged to lie in spaced-apart relation to pin-rotator socket 26 of torque generator 22 and coupled to vehicle-grip mover 18 of motion converter 14 to cause pin-rotator socket 26 of torque generator 22 to engage torque-receiver pin 16 of motion converter 14 along axis of pin rotation 72. Torque generator 22 of lifter drive unit 20 further includes generator housing 24 containing pin-rotator socket 26 and being formed to include exterior aperture 102 that is arranged to expose pin-rotator socket 26 to surroundings outside generator housing 24 to allow torque-receiver pin 16 to be inserted into pin-rotator socket 26 during coupling of generator mount 28 of lifter drive unit 20 to vehicle-grip mover 18 of motion converter 14 and generator mount 28 is coupled to generator housing 24 to lie in spaced-apart relation to pin-rotator socket 26 contained in generator housing 24.

Torque generator 22 of lifter drive unit 20 further includes socket-spinning system 104 contained in generator housing 24 and configured to apply spin-inducing torque to pin-rotator socket 26 to cause torque-receiver pin 16 to rotate about axis of pin rotation 72 when socket-spinning system 104 is energized electrically. Torque generator 22 further includes battery 106 detachably mounted in battery holder 107 coupled to an exterior surface 108 of generator housing 24 and configured to supply electricity to socket-spinning system 104 to energize socket-spinning system 104 electrically, as shown in FIG. 4. Socket-spinning system 104 comprises means for spinning pin-rotator socket 26 at a first speed measured in revolutions per minute to rotate torque-receiver pin 16 during a mode change of vehicle lifter 12 and at a relatively lower speed during movement of pin-rotator socket 26 along axis of pin rotation toward torque-receiver pin 16 as lifter drive unit 20 is being mounted on vehicle-grip mover 18 of motion converter 14 to facilitate mating engagement of pin-rotator socket 26 and torque-receiver pin 16.

Generator mount 28 includes grip-mover clamp 32 coupled to generator housing 24 to lie in spaced-apart relation to pin-rotator socket 26 of torque generator 22 and the grip-mover clamp 32 is configured to mate with vehicle-grip mover 18 of motion converter 14 to retain lifter drive unit 20 in a stationary position on vehicle-grip mover 18 while pin-rotator socket 26 of torque generator 22 is mated with torque-receiver pin 16 along axis of pin rotation 72, as suggested by FIGS. 7A and 11. Generator mount 28 further includes socket-alignment guide 30 separated from grip-mover clamp 32 and configured to provide guide means for slidably engaging vehicle-grip mover 18 to align pin-rotator socket 26 of torque generator 22 with torque-receiver pin 16 of motion converter 14 during mounting of lifter drive unit 20 on motion converter 14 so that torque-receiver pin 16 is inserted into pin-rotator socket 26 when grip-mover clamp 32 of generator mount 28 is mated with vehicle-grip mover 18 of motion converter 14 to retain lifter drive unit 20 in stationary position on vehicle-grip mover 18 of motion converter 14, as suggested by FIGS. 7B and 11.

Socket-alignment guide 30 includes a pair of laterally spaced-apart installation-alignment legs 124, 126 and each of installation-alignment legs 124, 126 is coupled to generator housing 24 and arranged to receive a portion of vehicle-grip mover 18 therebetween, as shown in FIG. 10. Socket-alignment guide 30 includes a first installation-alignment leg 124 cantilevered to generator housing 24 and arranged to mate with first exterior side wall 149 of vehicle-grip mover 18 and to cause a free end 125 of first installation-alignment leg 124 to face toward movable vehicle grip 40 of vehicle lifter 12 and a second installation-alignment leg 126 cantilevered to generator housing 24 and arranged to mate with a second exterior side wall 151 of vehicle-grip mover 18 and to cause a free end 127 of second installation-alignment leg 126 to face toward movable vehicle grip 40, as suggested by FIGS. 10 and 11.

Stationary base 38 includes a foundation 50 adapted to rest on the ground and grip support 42 arranged to extend upwardly from foundation 50 to support movable vehicle grip 40 for sliding motion along grip-motion axis 55, as shown in FIG. 3A. Generator housing 24 includes lower portion 120 facing toward stationary base 38 and upper portion 122 facing away from stationary base 38, grip-mover clamp 32 is coupled to upper portion 122 of generator housing 24, and socket-alignment guide 30 is coupled to lower portion 120 of generator housing 24 to lie between grip-mover clamp 32 and foundation 50 of stationary base 38, as suggested by FIG. 7B. In another illustrative embodiment, generator housing 24 includes lower portion 120 facing toward stationary base 38 and upper portion 122 facing away from stationary base 38, socket-alignment guide 30 is coupled to upper portion 120 of generator housing 24, grip-mover clamp 32 is coupled to lower portion 120 of generator housing 24 to lie between socket-alignment guide 30 and foundation 50 of stationary base 38

Grip-mover clamp 32 includes an opposing pair of spring-loaded tongs 34, 36 configured to cooperate to provide clamp means for yieldably gripping a portion of vehicle-grip mover 18 of motion converter 14 while torque-receiver pin 16 of motion converter 14 is engaged with pin-rotator socket 26 of torque generator 22 of lifter drive unit 20, as suggested by FIGS. 5 and 11. Spring-loaded tong 34 includes a pivot axle 35 coupled to generator housing 24, a pivotable clamp arm 37 mounted on pivot axle 35 for pivotable movement about an arm-pivot axis 39 aligned with pivot axle 35, a retainer 140 coupled to a first end 138 of pivotable clamp arm 37 and arranged to cooperate with pivotable clamp arm 37 to limit movement of generator housing 24 relative to vehicle-grip mover 18 when lifter drive unit 20 is mounted on motion converter 14, and a spring 134 interposed between generator housing 24 and pivotable clamp arm 37 and configured to yieldably urge retainer 140 normally to engage vehicle-grip mover 18 when lifter drive unit 20 is mounted on motion converter 14.

Spring-loaded tong 36 includes a pivot axle 235 and a pivotable clamp arm 237 coupled to pivot axle 235, as shown in FIG. 4. The pivot axle 235 is coupled to generator housing 24 and the pivotable clamp arm 237 mounted on pivot axle 235 for pivotable movement about an arm-pivot axis 249 aligned with pivot axle 235. The spring-loaded tong 36 further includes a retainer 240 coupled to a first end 238 of pivotable clamp arm 237 and arranged to cooperate with pivotable clamp arm 237 to limit movement of generator housing 24 relative to vehicle-grip mover 18 when lifter drive unit 20 is mounted on motion converter 14, and a spring 136 interposed between generator housing 24 and pivotable clamp arm 237 and configured to yieldably urge retainer 240 normally to engage vehicle-grip mover 18 when lifter drive unit 20 is mounted on motion converter 14.

Retainer 140 includes a removal-blocking surface 144 arranged to face toward and mate with vehicle-grip mover 18 when lifter drive unit 20 is mounted on motion converter 14 and a cam-ramp surface 146 that is included to define an acute included angle 145 between removal-blocking surface 144 and cam-ramp surface 146, as shown in FIG. 5. Cam-ramp surface 146 provides angular arm displacement means for pivoting pivotable clamp arm 37 in a first direction about arm-pivot axis 39 to compress spring 134 during movement of generator housing 24 toward vehicle-grip mover 18 and movement of pin-rotator socket 26 toward torque-receiver pin 16 as lifter drive unit 20 is being mounted on motion converter 14 so that pivotable clamp arm 37 is allowed to pivot in an opposite second direction under a force applied by spring 134 in a compressed state once tip 147 of retainer 140 established at intersection of removal-blocking surface 144 and cam-ramp surface 146 disengages exterior side wall 149 of vehicle-grip mover 18 to cause removal-blocking surface 144 to face toward and mate with front exterior wall 94 of vehicle-grip mover 18 that is arranged to face toward vehicle lifter 12, as shown in the sequence of FIGS. 8-11.

Retainer 240 includes a removal-blocking surface 244 arranged to face toward and mate with vehicle-grip mover 18 when lifter drive unit 20 is mounted on motion converter 14 and a cam-ramp surface 246 that is included to define an acute included angle 255 between removal-blocking surface 244 and cam-ramp surface 246, as shown in FIG. 5. Cam-ramp surface 246 provides angular arm displacement means for pivoting pivotable clamp arm 237 in a first direction about arm-pivot axis 249 to compress spring 136 during movement of generator housing 24 toward vehicle-grip mover 18 and movement of pin-rotator socket 26 toward torque-receiver pin 16 as lifter drive unit 20 is being mounted on motion converter 14 so that pivotable clamp arm 237 is allowed to pivot in an opposite second direction under a force applied by spring 136 in a compressed state once tip 247 of retainer 240 established at intersection of removal-blocking surface 244 and cam-ramp surface 246 disengages exterior side wall 151 of vehicle-grip mover 18 to cause removal-blocking surface 244 to face toward and mate with front exterior wall 94 of vehicle-grip mover 18 that is arranged to face toward vehicle lifter 12, as shown in the sequence of FIGS. 8-11.

Spring-loaded tong 34 further includes retainer-release fingergrip tab 142 coupled to second end 139 of pivotable clamp arm 37 opposite first end 138 of pivotable clamp arm 37, as shown in FIG. 11. Spring-loaded tong 36 includes retainer-release fingergrip tab 242 coupled to second end 239 of pivotable clamp arm 237 opposite first end 238 of the pivotable clamp arm 237, as shown in FIG. 11. The pivotable clamp arms 37, 237 of first and second spring-loaded tongs 34, 36 are arranged to pivot in opposite directions to cause retainers 140, 240 of first and second spring-loaded tongs 34, 36 to move away from one another as springs 134, 136 of first and second spring-loaded tongs 34, 36 are changed to compressed states during operator-actuated movement of retainer-release fingergrip tabs 142, 242 of first and second spring-loaded tongs 34, 36 toward one another to initiate dismounting of lifter drive unit 20 from vehicle-grip mover 18 of motion converter 14, as suggested by FIG. 11.

Generator housing 24 includes a first exterior side surface 99 facing toward first of spring-loaded tong 34, second exterior side surface 101 facing in an opposite direction toward second of spring-loaded tongs 36, front exterior surface 100 formed to include exterior aperture 102 exposing pin-rotator socket 26, and upwardly facing top surface 108 cooperating with first exterior side 99, second exterior side 101, and front surface 100 to form a boundary of an interior region 103 of generator housing 24 containing pin-rotator socket 26, as shown in FIG. 4. Generator housing 24 further includes a socket-spinner energy source 106 detachably mounted on upwardly-facing top exterior surface 108 of generator housing 24 and configured to provide electricity to energize socket-spinning system 104 contained in interior region 103 of generator housing 24 and coupled to pin-rotator socket 26, as suggested by FIG. 4.

Generator mount 28 includes socket-alignment guide 30 coupled to generator housing 24 and configured to provide guide means for slidably engaging vehicle-grip mover 18 of motion converter 14 to align pin-rotator socket 26 of torque generator 22 with torque-receiver pin 16 of motion converter 14 along axis of pin rotation 72 during mounting of lifter drive unit 20 on motion converter 14 so that torque-receiver pin 16 is inserted into pin-rotator socket 26 when lifter drive unit 20 is coupled to motion converter 14, as suggested by FIGS. 7A and 7B. Socket-alignment guide 30 includes first installation-alignment leg 124 and second installation-alignment leg 126 arranged to lie in spaced apart relation to first installation-alignment leg 124 to receive a portion of vehicle-grip mover 18 therebetween when lifter drive unit 20 is coupled to motion converter 14.

Generator housing 24 includes lower portion 120 coupled to socket-alignment guide 30 and relatively higher upper portion 122 arranged to lie above lower portion 120 and further comprising socket-spinner energy source 106 detachably mounted on upper portion 122 of generator housing 24 and configured to provide electricity to energize socket-spinning system 104 associated with pin-rotator socket 26 to spin pin-rotator socket 26 about axis of pin rotation 72 when energized by socket-spinner energy source 106, as suggested by FIGS. 7A and 7B. Generator mount 28 further includes grip-mover clamp 32 mounted on generator housing 24 to lie between socket-alignment guide 30 and socket-spinning energy source 106 and configured to retain generator housing 24 in a stationary position on vehicle-grip mover 18 when torque-receiver pin 16 is engaged to pin-rotator socket 26. In another illustrative embodiment, generator housing 24 includes lower portion 120 coupled to grip-mover clamp 32 and relatively higher upper portion 122 arranged to lie above lower portion 120 and further comprising socket-spinner energy source 106 detachably mounted on upper portion 122 of generator housing 24 and configured to provide electricity to energize socket-spinning system 104 associated with pin-rotator socket 26 to spin pin-rotator socket 26 about axis of pin rotation 72 when energized by socket-spinner energy source 106. Generator mount 28 further includes socket-alignment guide 30 mounted on generator housing 24 to lie between grip-mover clamp 32 and socket-spinning energy source 106. Socket-alignment guide 30 is used to align pin-rotator socket 26 with the torque-receiver pin 16 during installation of lifter drive unit 20 on motion converter 14 and configured to prevent rotation of generator housing 24 in relation to vehicle-grip mover 18 when pin-rotator socket 26 is transferring torque to torque-receiver pin 16. Grip-mover clamp 32 is configured to secure generator housing 24 to vehicle grip-mover 18 and retain generator housing 24 in a stationary position on vehicle-grip mover 18 when torque-receiver pin 16 is engaged to pin-rotator socket 26

Generator mount 28 includes a socket-alignment guide 30 configured to provide an alignment channel 29 receiving a portion of vehicle-grip mover 18 therein to align pin-rotator socket 26 with torque-receiver pin 16 along axis of pin rotation 72, suggested by FIG. 7B. Generator mount 28 includes grip-mover clamp 32 coupled to vehicle-grip mover 18 of motion converter 14 to retain pin-rotator socket 26 in engagement with torque-receiver pin 16 of motion converter 14, as suggested by FIG. 7B.

In another illustrative embodiment, the vehicle lifter 12 and the motion converter 14 may be used in a vehicle lifter kit with a handle or hand crank (not shown) that is manually rotatable by a user. The handle may be rotated to manually to provide torque to torque-receiver pin 16 of motion converter 14. The handle may be z-shaped with a grip defined on a first end and a pin-receiver socket defined in a second end. The pin-receiver socket may be coupled to torque-receiver pin 16 and configured to rotate torque-receiver pin 16 about axis of pin rotation 72 to cause vehicle-grip mover 18 of motion converter 14 to move movable vehicle grip 40 along grip-motion axis 55 relative to stationary base 38 during a mode change of vehicle lifter 12 between the COLLAPSED-STORAGE mode and the EXPANDED-USE mode. Although the handle is described as z-shaped, the handle may have any shape suitable to allow a user to manually rotate the handle to provide torque to torque-receiver pin 16 as described above.

Lifter system 10 is shown in FIG. 14 being used to stabilize a roof-resting motor vehicle 13. Lifter system 10 includes vehicle lifter 12, motion converter 14, and lifter drive unit 20. Vehicle lifter 12 includes a stationary base 38 and a movable vehicle grip 40 that slides relative to stationary base 38. Motion converter 14 provides a mechanical advantage for sliding motion of movable vehicle grip 40 relative to stationary base 38. Lifter drive unit 20 is removeably coupled to motion converter 14 and provides means for electrically powered operation of motion converter 14 so that a user of lifter system 10 can finely control extension/retraction of vehicle lifter 12 while managing physical exertion.

Lifter drive unit 20 may reduce work required of users to adjust length of vehicle lifter 12 when used with a motion converter 14 as suggested in FIG. 3. Lifter drive unit 20 may include torque generator 22, generator mount 28, and drive control 112 as shown in FIGS. 2 and 5. Torque generator 22 is electrically powered and provides rotational input for motion converter 14. Generator mount 28 removeably couples lifter drive unit 20 to motion converter 14 and vehicle lifter 12.

Torque generator 22 reduces work required from a user when extending or retracting vehicle lifter 12 by replacing a hand crank traditionally used with motion converter 14. Torque generator 22 may include battery 106 to provide electrical power, a motor driven by battery 106, and a speed reduction gear set 111. Speed reduction gear set 111 illustratively includes a spur gear 110, and a spur gear 113 coupled to pin-rotator socket 26, and a worm wheel 15 mating a worm gear defined on an end of motor 109, as shown in FIG. 4.

Motor 109 is a small, high speed 18 VDC motor inside with a 60:1 worm gear followed by a 7:1 spur gear set, which outputs to mating motion converter 14, as shown in FIG. 4. Gears may be like those available from KHK gears. An illustrative motor is 13000 RPM, 290 W, like those available, among other places, from DIGIKEY. It is within the scope of this disclosure for the speed reduction gear set 111 to include other gears suitable for rotating the pin-rotator socket at the desired torque and speed such as for example, a planetary gearbox. Pin-rotator socket 26 is illustratively a female ½" hex that mates to a ½" male hex or toque-receiver pin 16 attached to motion converter 14. Lifter system 10 may be used by a firefighting crew in aide and rescue of people trapped in cars and wrecks.

Generator mount 28 is configured to support torque generator 22 relative to motion converter 14 and vehicle lifter 12, as shown in FIG. 7A. Generator mount 28 may include a generator housing 24, a pair of laterally spaced-apart installation-alignment legs 124, 126, and spring-loaded tong 34, 36 as shown in FIG. 5. Generator housing 24 is made from a front shell 95 and a back shell 97 that contain components of torque generator 22. Installation-alignment legs 124, 126 extend forward from front shell 95 to align generator housing 24 with motion converter 14. Spring-loaded tong 34, 36 are mounted to pivot relative to generator housing 24 via pivot axle 35 and 235 and selectively engage motion converter 14 to selectively lock generator mount 28 to motion converter 14 and vehicle lifter 12.

Drive control 112 is designed to allow a user to extend and retract vehicle lifter 12 by providing rotational input to motion converter 14 as suggested in FIGS. 2 and 3. Drive control 112 may include power-switching ON-OFF button 114, direction-selecting UP-DOWN switch 116, and fast-rotation buttons 118, as shown in FIG. 6. Upon powering on of lifter drive unit 20 and selection of a drive direction via UP-DOWN switch 116, a user can engage fast-rotation buttons 118 to electrically drive motion converter 14 and thereby extend/retract vehicle lifter 12.

Fast-rotation buttons 118 may be a pair of buttons 118 arranged opposite one another so as to avoid unintentional movement caused by bumping a single input, as shown in FIG. 6. Moreover, fast-rotation buttons 118 provide a "deadman" switch. So, when a person operating motion converter 14 via lifter drive unit 20 becomes unconscious or incapable of operating motion converter 14, they naturally will let go of at least one button of the pair of buttons 118 stopping movement of motion converter 14. Two buttons 118 encourages a user to have situational awareness while operating.

The invention claimed is:

1. A lifter system comprising
   a vehicle lifter including a stationary base adapted to rest on the ground and a movable vehicle grip movable relative to the stationary base between an extended position associated with an expanded-use mode of the vehicle lifter to raise a vehicle relative to the ground and a contracted position associated with a collapsed-storage mode of the vehicle lifter to make the vehicle lifter more compact for storage and transit,
   a motion converter including a torque-receiver pin that is mounted for rotation about an axis of pin rotation and a vehicle-grip mover configured to move the movable vehicle grip up and down along a grip-motion axis in response to rotation of the torque-receiver pin about the axis of pin rotation, and
   a lifter drive unit including a torque generator and a separate generator mount, wherein the torque generator has a pin-rotator socket that is coupled to the torque-receiver pin and configured to rotate the torque-receiver pin about the axis of pin rotation to cause the vehicle-grip mover to move the movable vehicle grip along the grip-motion axis relative to the stationary base during a mode change of the vehicle lifter between the collapsed-storage mode and the expanded-use mode, and wherein the generator mount is arranged to lie in spaced-apart relation to the pin-rotator socket of the torque generator and coupled to the vehicle-grip mover of the motion converter to cause the pin-rotator socket of the torque generator to engage the torque-receiver pin of the motion converter along the axis of pin rotation.

2. The lifter system of claim 1, wherein the torque generator of the lifter drive unit further includes a generator housing containing the pin-rotator socket and being formed to include an exterior aperture that is arranged to expose the pin-rotator socket to surroundings outside the generator housing to allow the torque-receiver pin to be inserted into the pin-rotator socket during coupling of the generator mount of the lifter drive unit to the vehicle-grip mover of the motion converter and the generator mount is coupled to the generator housing to lie in spaced-apart relation to the pin-rotator socket contained in the generator housing.

3. The lifter system of claim 2, wherein the torque generator of the lifter drive unit further includes a socket-spinning system contained in the generator housing and configured to apply a spin-inducing torque to the pin-rotator socket to cause the torque-receiver pin to rotate about the axis of pin rotation when the socket-spinning system is energized electrically.

4. The lifter system of claim 3, wherein the torque generator further includes a battery detachably mounted in a battery holder coupled to an exterior surface of the generator housing and configured to supply electricity to the socket-spinning system to energize the socket-spinning system electrically.

5. The lifter system of claim 3, wherein the socket-spinning system comprises means for spinning the pin-rotator socket at a first speed measured in revolutions per minute to rotate the torque-receiver pin during a mode change of the vehicle lifter and at a relatively lower speed during movement of the pin-rotator socket along the axis of pin rotation toward the torque-receiver pin as the lifter drive unit is being mounted on the vehicle-grip mover of the motion converter to facilitate mating engagement of the pin-rotator socket and the torque-receiver pin.

6. The lifter system of claim 2, wherein the generator mount includes a grip-mover clamp coupled to the generator housing to lie in spaced-apart relation to the pin-rotator socket of the torque generator and the grip-mover clamp is configured to mate with the vehicle-grip mover of the motion converter to retain the lifter drive unit in a stationary position on the vehicle-grip mover while the pin-rotator socket of the torque generator is mated with the torque-receiver pin along the axis of the pin rotation.

7. The lifter system of claim 6, wherein the generator mount further includes a socket-alignment guide separated from the grip-mover clamp and configured to provide guide means for slidably engaging the vehicle-grip mover to align the pin-rotator socket of the torque generator with the torque-receiver pin of the motion converter during mounting of the lifter drive unit on the motion converter so that the torque-receiver pin is inserted into the pin-rotator socket when the grip-mover clamp of the generator mount is mated with the vehicle-grip mover of the motion converter to retain the lifter drive unit in the stationary position on the vehicle-grip mover of the motion converter.

8. The lifter system of claim 7, wherein the socket-alignment guide includes a pair of laterally spaced-apart installation-alignment legs and each of the installation-alignment legs is coupled to the generator housing and arranged to receive a portion of the vehicle-grip mover therebetween.

9. The lifter system of claim 7, wherein the socket-alignment guide includes a first installation-alignment leg cantilevered to the generator housing and arranged to mate with a first exterior side wall of the vehicle-grip mover and to cause a free end of the first installation-alignment leg to face toward the movable vehicle grip of the vehicle lifter and a second installation-alignment leg cantilevered to the generator housing and arranged to mate with a second exterior side wall of the vehicle-grip mover and to cause a free end of the second installation-alignment leg to face toward the movable vehicle grip.

10. The lifter system of claim 7, wherein the stationary base includes a foundation adapted to rest on the ground and a grip support arranged to extend upwardly from the foundation to support the movable vehicle grip for sliding motion along the grip-motion axis, the generator housing includes a lower portion facing toward the stationary base and an upper portion facing away from the stationary base, the grip-mover clamp is coupled to the upper portion of the generator housing, and the socket-alignment guide is coupled to the lower portion of the generator housing to lie between the grip-mover clamp and the foundation of the stationary base.

11. The lifter system of claim 6, wherein the grip-mover clamp includes an opposing pair of spring-loaded tongs configured to cooperate to provide clamp means for yieldably gripping a portion of the vehicle-grip mover of the motion converter while the torque-receiver pin of the motion converter is engaged with the pin-rotator socket of the torque generator of the lifter drive unit.

12. The lifter system of claim 10, wherein each spring-loaded tong includes a pivot axle coupled to the generator housing, a pivotable clamp arm mounted on the pivot axle for pivotable movement about an arm-pivot axis aligned with the pivot axle, a retainer coupled to a first end of the pivotable clamp arm and arranged to cooperate with the pivotable clamp arm to limit movement of the generator housing relative to the vehicle-grip mover when the vehicle lifter device is mounted on the motion converter, and a spring interposed between the generator housing and the pivotable clamp arm and configured to yieldably urge the retainer normally to engage the vehicle-grip mover when the vehicle lifter device is mounted on the motion converter.

13. The lifter system of claim 12, wherein the retainer includes a removal-blocking surface arranged to face toward and mate with the vehicle-grip mover when the vehicle lifter device is mounted on the motion converter and a cam-ramp surface that is included to define an acute included angle between the removal-blocking surface and the cam-ramp surface to provide angular arm displacement means for pivoting the pivotable clamp arm in a first direction about the arm-pivot axis to compress the spring during movement of the generator housing toward the vehicle-grip mover and movement of the pin-rotator socket toward the torque-receiver pin as the vehicle lifter device is being mounted on the motion converter so that the pivotable clamp arm is allowed to pivot in an opposite second direction under a force applied by the spring in a compressed state once a tip of the retainer established at the intersection of the removal-blocking surface and the cam-ramp surface disengages a side wall of the vehicle-grip mover to cause the removal-blocking surface to face toward and mate with a forward surface of the generator housing that is arranged to face toward the vehicle lifter.

14. The lifter system of claim 12, wherein each spring-loaded tong includes a retainer-release fingergrip tab coupled to an opposite second end of the pivotable clamp arm and the pivotable clamp arms of the first and second spring-loaded tongs are arranged to pivot in opposite directions to cause the retainers of the first and second spring-loaded tongs to move away from one another as the springs of the first and second spring-loaded tongs are changed to compressed states during operator-actuated movement of the retainer-release fingergrip tabs of the first and second spring-loaded tongs toward one another to initiate dismounting of the lifter drive unit from the vehicle-grip mover of the motion converter.

15. The lifter system of claim 11, wherein the generator housing includes a first exterior side surface facing toward a first of the spring-loaded tongs, a second exterior side surface facing in an opposite direction toward a second of the spring-loaded tongs, a front exterior surface formed to include the exterior aperture exposing the pin-rotator socket, and an upwardly facing top surface cooperating with the first exterior side, second exterior side, and front surfaces to form a boundary of an interior region of the generator housing containing the pin-rotator socket and further comprising a socket-spinner energy source mounted on the upwardly-facing top exterior surface of the generator housing and configured to provide electricity to energize a socket-spinning system contained in the interior region of the generator housing and coupled to the pin-rotator socket.

16. The lifter system of claim 2, wherein the generator mount includes a socket-alignment guide coupled to the generator housing and configured to provide guide means for slidably engaging the vehicle-grip mover of the motion converter to align the pin-rotator socket of the torque generator with the torque-receiver pin of the motion converter along the axis of pin rotation during mounting of the lifter drive unit on the motion converter so that the torque-receiver pin is inserted into the pin-rotator socket when the lifter drive unit is coupled to the motion converter.

17. The lifter system of claim 16, wherein the socket-alignment guide includes a first installation-alignment leg and a second installation-alignment leg arranged to lie in spaced apart relation to the first installation-alignment leg to receive a portion of the vehicle-grip mover therebetween when the lifter drive unit is coupled to the motion converter.

18. The lifter system of claim 16, wherein the generator housing includes a lower portion coupled to the socket-alignment guide and a relatively higher upper portion arranged to lie above the lower portion and further comprising a socket-spinner energy source mounted on the upper portion of the generator housing and configured to provide electricity to energize a socket-spinning system associated with the pin-rotator socket to spin the pin-rotator socket about the axis of pin rotation when energized by the socket-spinner energy source.

19. The lifter system of claim 16, wherein the generator mount further includes a grip-mover clamp mounted on the generator housing to lie between the socket-alignment guide and the socket-spinning energy source and configured to retain the generator housing in a stationary position on the vehicle-grip mover when the torque-receiver pin is engaged to the pin-rotator socket.

20. The lifter system of claim 1, wherein the generator mount includes a socket-alignment guide configured to provide an alignment channel receiving a portion of the vehicle-grip mover therein to align the pin-rotator socket with the torque-receiver pin along the axis of pin rotation and a grip-mover clamp coupled to the vehicle-grip mover of the motion converter to retain the pin-rotator socket in engagement with the torque-receiver pin of the motion converter.

* * * * *